United States Patent [19]

Hoch

[11] 3,825,328

[45] July 23, 1974

[54] OPTICAL SYSTEM FOR A STEREOSCOPIC MOTION PICTURE CAMERA

[76] Inventor: Winton C. Hoch, 1491 Stone Canyon Rd., Los Angeles, Calif. 90024

[22] Filed: Sept. 10, 1973

[21] Appl. No.: 396,110

[52] U.S. Cl............... 352/60, 350/130, 350/137, 350/138, 352/65
[51] Int. Cl. .......................................... G03b 35/02
[58] Field of Search .......... 352/57, 60, 65; 350/130, 350/137, 138

[56] References Cited
UNITED STATES PATENTS
3,019,698  2/1962  Sheldon .......................... 350/130 X Primary Examiner—Monroe H. Hayes
Attorney, Agent, or Firm—Fulwider, Patton, Rieber, Lee & Utecht

[57] ABSTRACT

An optical system for making stereoscopic motion pictures which may be attached to a conventional motion picture camera of the type including a supply of film and a film drive mechanism for advancing the film past a picture aperture. The optical system makes it possible to produce simultaneously stereo pairs of adjacent, vertically spaced left and right images of the field of view one above the other on the film. The system includes laterally spaced left and right objective lenses forming left and right images of the field of view. Corresponding, image erecting systems provide folded optical paths to a single inverting relay lens which directs the focused, vertically aligned and spaced, left and right images on the film within the desired film area. The left and right image erecting systems cause an opposite reversal of image orientation to the image reversal caused by the relay lens and also bring the left and right images into vertically aligned and separated relation on the incident side of the relay lens, thus ensuring correct image orientation as well as vertical alignment and spacing of the left and right images on the film.

32 Claims, 15 Drawing Figures

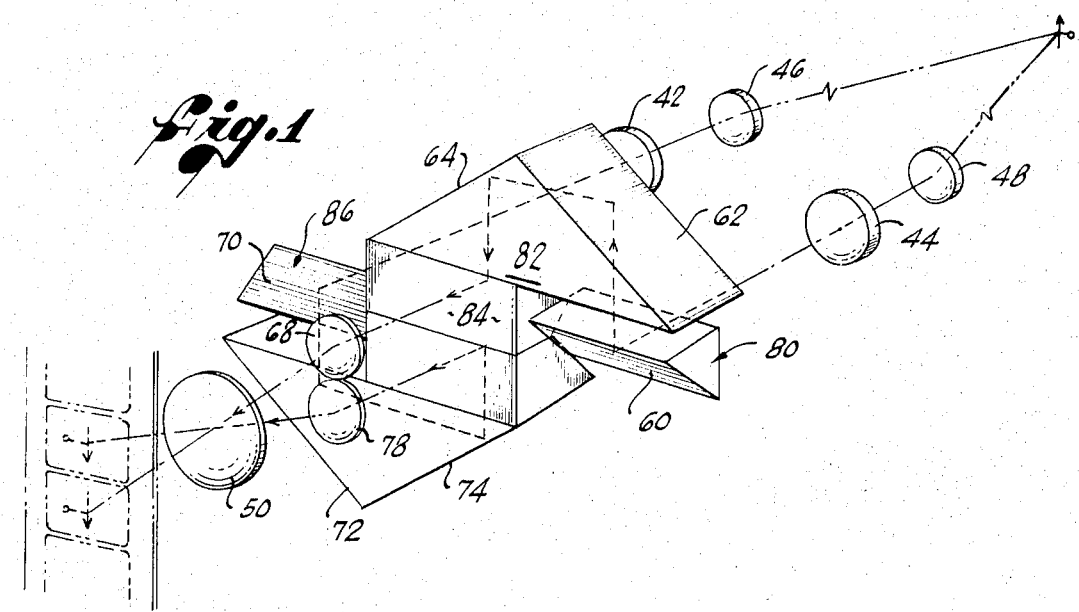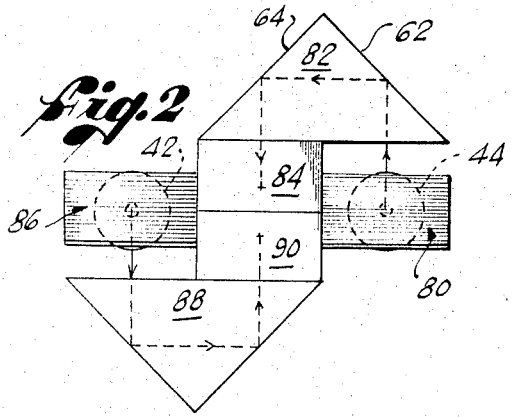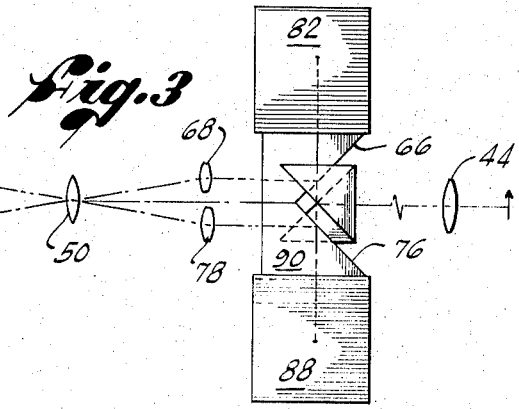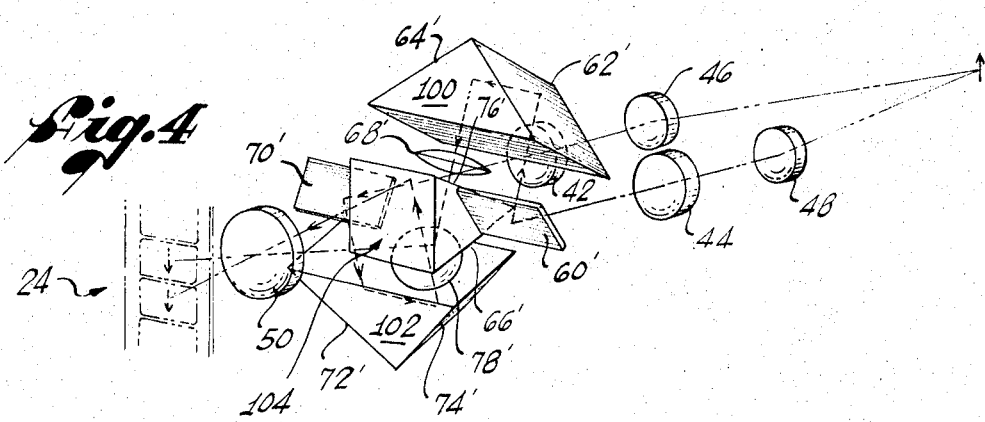

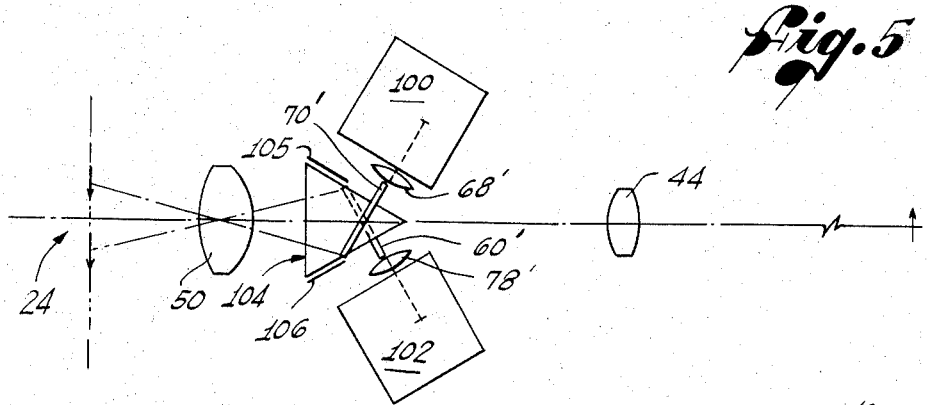
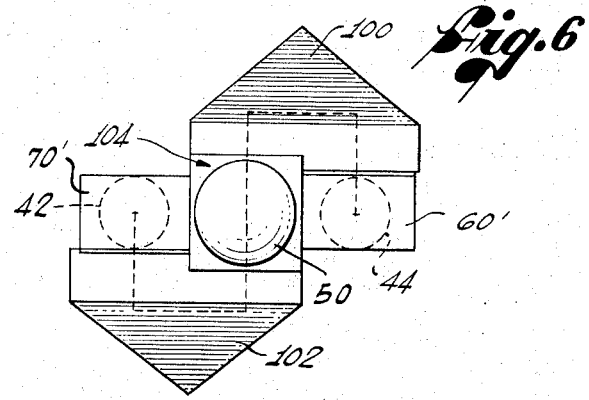
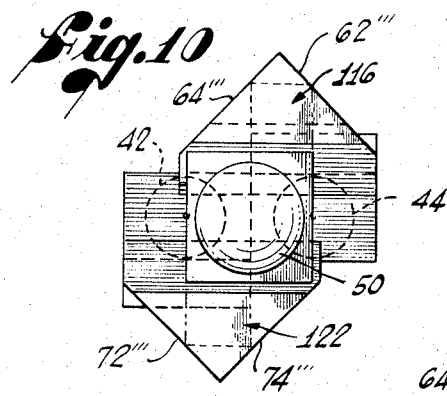
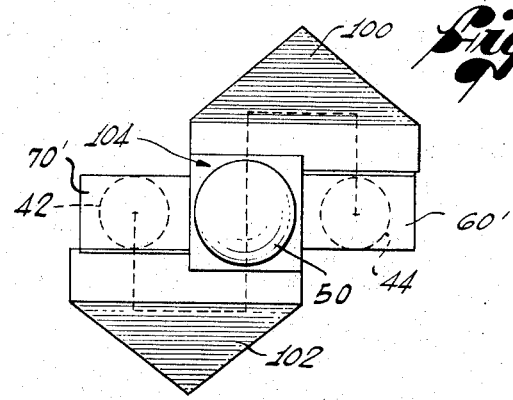
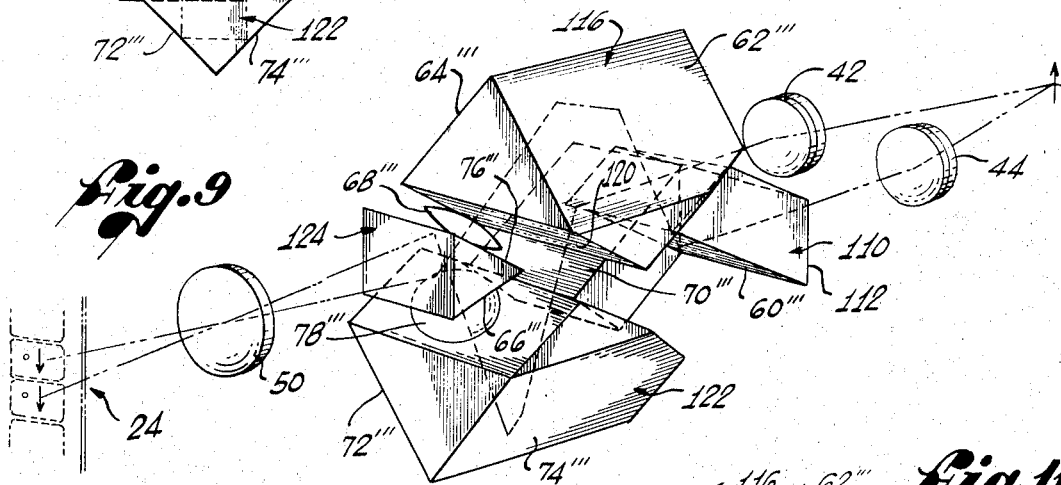
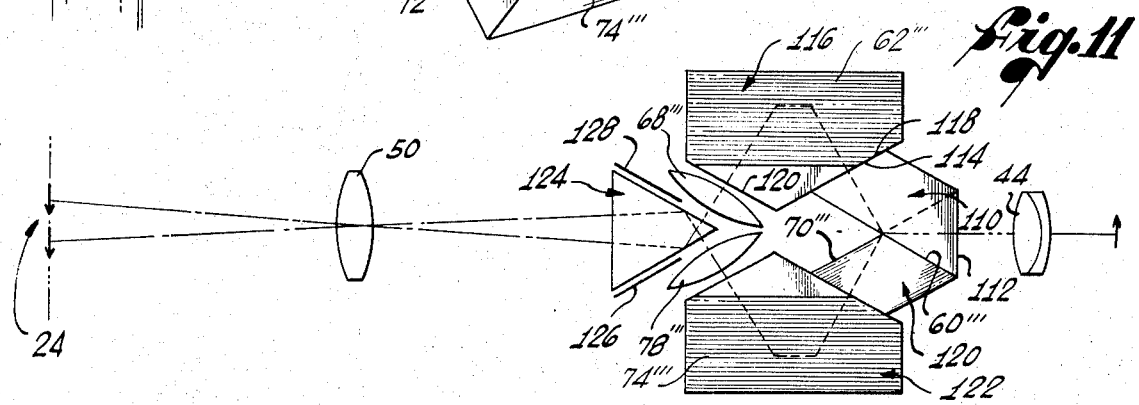

3,825,328

OPTICAL SYSTEM FOR A STEREOSCOPIC MOTION PICTURE CAMERA

BACKGROUND OF THE INVENTION

This invention relates generally to stereoscopic optical systems and, more particularly, to improvements in optical systems adapted for attachment to a motion picture camera to enable it to film stereoscopic motion pictures.

In filming stereoscopic motion pictures, it is necessary to photograph simultaneously exposed, laterally separated, left and right views of the subject, for reasons that are well-known. One initial approach was to utilize two movie cameras, side-by-side producing two films which were subsequently developed and then projected in synchronism. Apart from the obvious disadvantages that the necessary equipment and number of film strips used had to be doubled, problems in maintaining synchronization, illumination and registration of the projected films were so numerous and frequent as to severely impair the three-dimensional quality of the projected picture.

To avoid those disadvantages, systems were developed that produced the requisite pairs of simultaneously exposed left and right images upon a single film strip. Several such systems, for example, position the images in side-by-side relation within the area of each film frame. The side-by-side relationship suffers from many problems one of which is the problem that if there should be an edge fault during printing of the film or for other reasons, the edge fault affects either all the right or all the left images, and the three-dimensional quality suffers seriously during viewing during projection. For this reason in addition to the many others, it has been considered preferable to place the left and right images vertically rather than in side-by-side relation on the film strip so that these problems can be alleviated.

Most prior systems for producing vertically spaced pairs of left and right images on a film strip have required specially built stereoscopic camera equipment. However, as the number of stereoscopic motion pictures which are made is much lower than the number of conventional two-dimensional motion pictures, there have been attempts to develop a stereo camera system which could be secured as an attachment to a conventional two-dimensional movie camera to convert it to a three-dimensional camera when necessary thus facilitating 3-D production. Many conventional two-dimensional motion picture cameras now in use are of the reflex type having a lens mount, for attaching interchangeable lenses, which is spaced by a gap of as much as two inches to three inches from the picture aperture through which the film passes. A gap of this dimension is necessary to accommodate the angled mirror and shutter of a reflex camera, which has a reflective surface on one side to reflect the image formed by the objective lens to the viewfinder. This gap can prevent the use of certain prior stereo optical systems currently in use which involve the use of shaped prisms which are required to extend into close relation to the picture aperture.

To project the images across the gap between the lens ring and the picture aperture, one approach would be to mount a relay lens at the termination of the stereo optical system having a sufficient focal length to project focused, vertically separated images across the gap. However, such a relay lens would inherently invert and laterally reverse the images. When the film was subsequently projected, both images would therefore be inverted and reversed from right to left.

It is therefore an object of the present invention to provide an attachment which can be readily attached to and detached from a conventional two-dimensional motion picture camera having a substantial gap between its lens mount and its picture aperture, to enable the creation of pairs of aligned, vertically separated left and right images within the space of each film frame wherein the images produced on the film are in the correct orientation for subsequent projection through a movie projector.

SUMMARY OF THE INVENTION

An optical system according to the invention can be readily attached to and detached from a conventional two-dimensional motion picture camera, which can be of the reflex type, to enable it to be used for filming stereoscopic motion pictures. To accommodate the gap between the lens mount and the picture aperture of the camera, the system incorporates a relay lens of sufficient focal length to project the two images across the gap. Because the relay lens inherently inverts and laterally reverses the images, left and right image erecting systems are provided in front of the relay lens in combination with the left and right objective lenses. The image erecting systems cause a change of orientation of the left and right images which is opposite to the change in orientation caused by the relay lens, thus correcting for the inversion caused by the relay lens. As a result, the orientation of the projected left and right images on the screen is the same orientation as the originally photographed field of view.

The left and right image erecting systems, in addition to erecting the images, also vertically space and align the left and right images incident to the relay lens. As a result, the relay lens forms two vertically aligned and separated, left and right images on the film, each image occupying approximately one vertical half of each frame area.

In the illustrative embodiments of the invention, each image erecting system causes four consecutive reflections. Two of the reflections collectively cause a 180° lateral reversal of the image while the other two reflections collectively cause a 180° vertical reversal. The relay lens causes 180° vertical and lateral reversals of the orientation of the images incident to the relay lens formed by the image erecting systems. Thus, the net change in vertical and lateral orientation caused by the combination of the relay lens and the left and right image erecting systems is zero. As a result, the left and right images formed on the film are in the correct vertical and lateral orientation.

In an additional aspect of the invention the image erecting system can include an isosceles prism, the side faces of which constitute final reflecting surfaces for the left and right image paths. Vignetting masks are associated with the prism to ensure matched light distribution across the images and compensate for inherent vignetting effects.

Although the invention is particularly described herein with reference to motion picture cameras, stereo-optical systems according to the various embodiments of the invention can also be used on slide and still cameras if desired.

These and other features and advantages of th invention are discussed in the detailed description which follows.

BRIEF DESCRIPTION OF THE DRAWINGS

An optical system according to certain preferred embodiments of the invention is illustrated in the accompanying drawings in which:

FIG. 1 is a simplified perspective view of an optical system according to a first embodiment of the invention;

FIG. 2 is a rear, end view of the optical system according to the first embodiment shown in FIG. 1;

FIG. 3 is a side view of the optical system according to the first embodiment shown in FIG. 1;

FIG. 4 is a simplified perspective view of an optical system according to a second embodiment of the invention;

FIG. 5 is a side viw of the optical system according to the second embodiment shown in FIG. 4;

FIG. 6 is a simplified rear, end view of the optical system according to the second embodiment shown in FIG. 4;

FIG. 9 is a simplified perspective view of an optical system according to a fourth embodiment of the invention;

FIG. 10 is a rear end view of the optical system according to the fourth embodiment shown in FIG. 9;

FIG. 11 is a side view of the optical system according to the fourth embodiment shown in FIG. 9;

DETAILED DESCRIPTION

Figure 12:
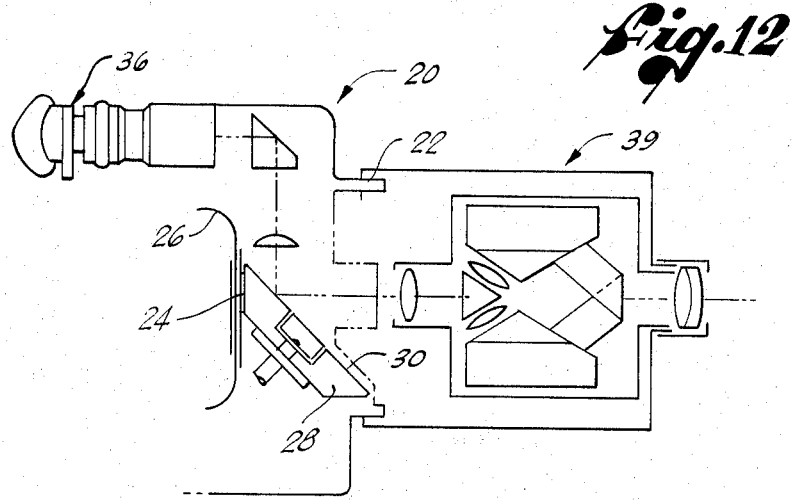
FIG. 12 is a simplified representative view of a reflex camera provided with an optical system according to the fourth embodiment of the invention.

An optical system according to the invention is intended for attachment to a motion picture camera 20, shown in simplified form in FIG. 12. The camera 20 can be a standard reflex motion picture camera, such as for example, a Model BNCR camera manufactured by Mitchell Camera Corporation of Glendale, Calif. The camera has a housing which includes a circular lens mount 22 defining a lens opening. Spaced rearwardly of the lens mount is structure comprising a picture aperture 24 past which film 26 is moved vertically in successive film frame exposures by a film advance mechanism. Positioned between the picture aperture 24 and the opening defined by the lens mount is a rotary mirror and shutter 28 having an inclined reflective front surface 30 which reflects an image upwardly through a conventional optical system to the camera viewfinder 36 when the shutter is closed. The gap extending in front of the picture aperture 24 may typically be in the range of 2 to 3 inches which precludes the use of certain prior attachments which require prisms having their exit surfaces placed very closely adjacent the film. It will be understood, however, that the optical system of the present invention is not in any way confined to use with reflex cameras and may equally well be used with cameras of non-reflex design. In addition the optical system may be utilized in conjunction with cameras used to record the images electronically, e.g. on magnetic tape, rather than on photographic film.

The optical system is housed within a housing 39 which is releasably connected to the lens mount 22 extending forwardly from it. Within the housing 39 are mounted a plurality of lenses and prisms constituting the optical system of the invention by conventional lens and prism supporting means (not shown). As shown in FIG. 12, the optical system within the housing 39 is in accordance with a fourth embodiment of the invention to be described subsequently. However, it will be understood that generally similar arrangements are utilized to support optical systems according the first, second and third embodiments of the invention hereinafter described.

The first embodiment of the optical system shown in FIG. 1 includes horizontally and laterally separated, left and right, objective lenses 42 and 44. The objective lenses, in all embodiments, are supported in conventional focusing mounts. Concave lens elements 46 and 48 are positioned on the incident side of the objective lenses to widen their field of view in all embodiments of the invention.

The system also includes a relay lens 50 which is of sufficient focal length to project focused, vertically separated images across the gap needed for the reflex optics. Because the relay lens 50 is an inverting lens, it is necessary to provide image erecting systems between the objective lenses 42 and 44 and the relay lens 50 to compensate for the relay lens. Separate, left and right image erecting systems are provided for this purpose.

Considering the right image erecting system (FIG. 1), this includes a first reflecting surface 60 positioned to receive light rays passing rearwardly through the right objective lens 44 and reflect them upwardly in a first path at a right angle to the incident rays. A second reflecting surface 62, positioned to receive the light rays reflected by the first reflecting surface 60, reflects the light rays laterally and horizontally at a right angle along a second path. A third reflecting surface 64, positioned to receive light rays from the second reflecting surface 62, reflects the light rays downwardly at a right angle along a third path. A fourth reflecting surface 66 (FIG. 3), positioned to receive the light rays reflected by the third reflecting surface 64, reflects the light rays horizontally and rearwardly at a right angle along a fourth path. The rays then pass through a field lens 68 (to be discussed hereafter) and then to the relay lens 50. The relay lens 50 inverts and laterally reverses the image in projecting it across the gap and forms a sharply focused, right image in the lower vertical half area of one film frame.

Figure 14:
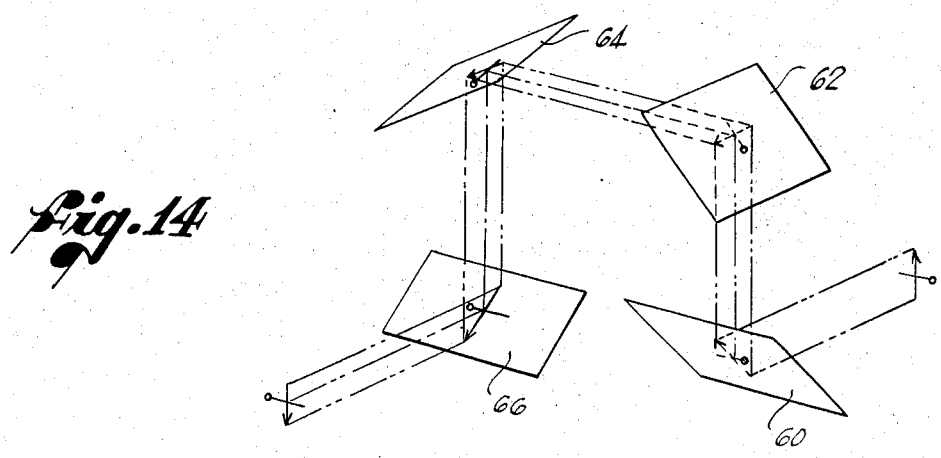
FIG. 14 is a simplified schematic perspective view of a reflective, image erecting system utilized in the above embodiments of the invention.

The action of the image erecting system in correcting the image reversal caused by the relay lens is illustrated, in simplified format, in FIG. 14. At each of the first and fourth reflecting surfaces 60 and 66, the image undergoes 90° reflections in the vertical plane in an additive relation so that the image reflected by the surface 66 has undergone a collective vertical reversal of 180°. Similarly, at each of the reflecting surfaces 62 and 64 the image is reflected through 90° to undergo a collective lateral reversal of 180°. The 180° reversal in each of the vertical and lateral planes is reversed by the relay lens 50 so that the net effect is to orient the image in the same orientation as it had on the incident side to the image erecting system.

Where the initial image reflections are greater and less than 90°, as will be described for the other embodiments hereafter, the successive reflections are through supplemental angles so that in each embodiment the collective reversal in each of the horizontal and vertical planes is still 180°.

Figure 15:
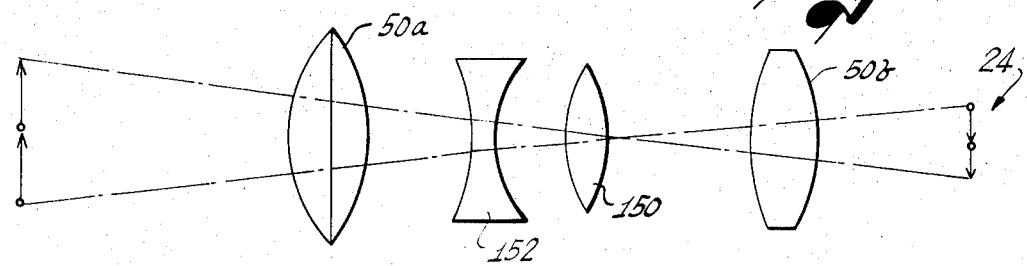
FIG. 15 is a simplified schematic perspective view of an anamorphic lens system which may be included in each of the embodiments of the invention.

In the foregoing discussion with relation to FIG. 15, for simplicity the light rays have been shown following parallel paths through the successive reflections. In actuality, the light rays may be following divergent and/or convergent paths, dependent on the focal lengths and relative positions of the objective lenses and the field lenses.

In the first embodiment of focal length of the objective lenses are such that they form their respective left and right images after the fourth reflection, at or very close to the associated field lenses. Each field lens gathers the light from the associated objective lens and redirects it into the relay lens.

The image formed by the left objective lens 42 undergoes a corresponding but opposite series of reflections via a fifth reflecting surface 70 (FIG. 1), a sixth reflecting surface 72, a seventh reflecting surface 74 and an eighth reflecting surface 76 (FIG. 3). The reflected left image then passes through a lower field lens 78 and the relay lens 50 to form a focused left image in the upper vertical half area of the same film frame.

It will be appreciated that the left and right image erecting systems just described not only ensure the correct orientation of the images on the film but also perform the function of aligning and vertically separating the incident images provided to the relay lens so that the relay lens 50 can form the focused, vertically aligned and separated, left and right images on the upper and lower vertical halves of the film area.

Considering the structure of the right image erecting system in more detail, the first reflecting surface 60 comprises the hypotenuse face of a laterally extending, right angle prism 80. The surface 60 is inclined upwardly and rearwardly at 45 degrees to the vertical with the vertical face of the prism 80 facing forwardly towards the objective lens 44. The second and third reflecting surfaces 62 and 64 are constituted by the side faces of a porro prism 82 which has its hypotenuse face parallel to and spaced above a horizontal reference plane which extends laterally and horizontally and intersects the vertical center point of the picture aperture. The porro prism 82 extends in a lateral direction to overlap the prism 84. The fourth reflecting surface 66 is constituted by the hypotenuse face of a further right angle prism 84 (FIG. 3). The prism 84 extends laterally with its vertical face facing rearwardly towards the upper field lens 68.

The reflecting surfaces of the left image erecting system are similarly formed. Thus, the fifth reflecting surface comprises the hypotenuse face of a laterally extending right angle prism 86, the sixth and seventh reflecting surfaces are constituted by the side faces of another porro prism 88 having its hypotenuse face spaced below and parallel to the horizontal reference plane, and the right reflecting surface 76 is constituted by the hypotenuse face of a further prism 90 (FIG. 3) having its vertical face facing rearwardly towards the lower field lens 78.

To enable the vertical spacing between the left and right images to be sufficiently reduced to that required on occasion by the geometry of the field and relay lenses and the picture aperture, the adjacent vertical corners of the prisms 84 and 90 are removed (FIG. 3) so that the prisms are truncated. This enables the hypotenuse faces 66 and 76 to be brought relatively closer together to provide the desired spacing. In an alternative configuration it can be arranged to utilize prisms which are not truncated.

The prisms 84 and 90 are positioned in vertical alignment above each other so that the images reflected by the surfaces 66 and 76 are vertically aligned. As can be seen from FIG. 2, the effect is that the porro prisms 82 and 88 bring the left and right images laterally into vertical alignment while the prisms 84 and 90 determine the necessary vertical separation to enable the relay lens 50 to form the vertical separated left and right images on the film. A septum, or thin diaphragm (not shown), may additionally be positioned as a mask in the horizontal reference plane adjacent the picture aperture to further assist in answering separation without merger between the vertically spaced images on the film.

Air gaps may be provided between various parallel faces of the prisms described to eliminate the creation of double images by internal reflections within the system.

In a second embodiment of the invention, the arrangement of prisms and field lenses between the objective lenses 42 and 44 and the relay lens 50 is changed as shown in FIGS. 4–6. In the second embodiment, the vertical reflected first paths of the light rays are at an inclination of less than a right angle to the paths of the incident light rays from the objective lenses.

Considering the light path from the objective lens 44, the light rays are reflected upwardly by a first reflecting surface 60' constituted by an upwardly and rearwardly inclined plane mirror. The reflected first path extends at an inclination of less than a right angle to the incident light rays from the objective lens. The light rays from the first reflecting surface 60' are reflected laterally and horizontally at a right angle along their second path by a second reflecting surface 62'. The reflecting surface 62' is constituted by a side face of a porro prism 100 which has its hypotenuse face spaced above the horizontal reference plane at an upward and rearward inclination such as to place the hypotenuse face essentially perpendicular to the path of the light rays reflected by the first reflecting surface 60' (FIG. 5). The other side face of the prism 100 constitutes a third reflecting surface 64' (FIG. 4) which reflects the light rays downwardly in spaced, parallel relation to the first path of reflection but in an opposite direction of travel. After exiting through the hypotenuse face of the prism 100, the light rays in the third path pass through a field lens 68' and are then reflected by a fourth reflecting surface 66' along a fourth path to the relay lens 50. The relay lens 50 laterally and vertically reverses the image and forms a focused right image in the upper half area of the film frame within the picture aperture 24.

The sequence of four reflections is generally similar to that described for the first embodiment and has the same effect in causing a change in vertical and lateral image orientation which is opposite to the reversal of image orientation caused by the relay lens.

The optical path for the left image is similar, but with the reflecting surfaces oppositely positioned. It includes a fifth reflecting surface 70' constituted by an inclined mirror, sixth and seventh reflecting surfaces 72' and 74', respectively, constituted by the side faces of another porro prism 102 having its hypotenuse face inclined vertically and rearwardly down, and an eighth reflecting surface 76'. A lower field lens 78' (FIG. 5) is positioned in the path of the light rays between the seventh and eighth reflecting surfaces.

The fourth and eighth reflecting surfaces 66' and 76' are constituted by equal, upper and lower side inner faces of an isosceles 60' prism 104 (FIG. 5). Isosceles prism 104 has clear uncoated surfaces and an index of refraction sufficient to totally reflect the light rays that have entered the prism, all of which strike the opposite angled interior glass air surfaces 66' and 76' at angles of total reflection. The prism 104 has its forward apex lying in the horizontal reference plane with the side surfaces constituting the reflecting surfaces 66' and 76' extending vertically below and above the reference plane at opposite 30° inclinations thereto. The third face of the prism 104 extends vertically and faces towards the relay lens 50.

The focal lengths of the objective lenses 42 and 44 in the embodiment of FIGS. 4–6 are such that they form their respective prime images after the third reflection, at or close to the field lenses 68' and 78'. The position at which the prime images are formed is significant in relation to vignetting of the image. If a tunnel diagram of the reflective system of the second embodiment is made, there is found to be a light restriction caused by the apex of the 60° equilateral prism 104. The effect is that some of the imaging light rays from one side of the images would pass forwardly of the apex of the prism and would not be reflected to the relay lens while on the other side of prime image, away from the apex, there would be a continuing light path through the prism for all its imaging rays at the other image extreme, leading to brighter illumination at one part of the images than the other. To avoid a change in light intensity across the image, it is therefore necessary to introduce opaque vignetting masks 105 and 106 (shown in FIG. 5 only) which ensure a matched distribution of light rays across the image.

As compared with the first embodiment, it will be noted that the isosceles prism of the second embodiment performs the two reflections performed by the two right angle prisms of the first embodiment and can therefore offer a relatively more compact optical assembly. In addition, the prime image in the second embodiment is formed after the third reflection, whereas, it is not formed until after the fourth reflection in the first embodiment. However, the first embodiment may be especially suitable for applications involving objective lenses of particularly long focal length used for special photographic applications.

Figure 7:
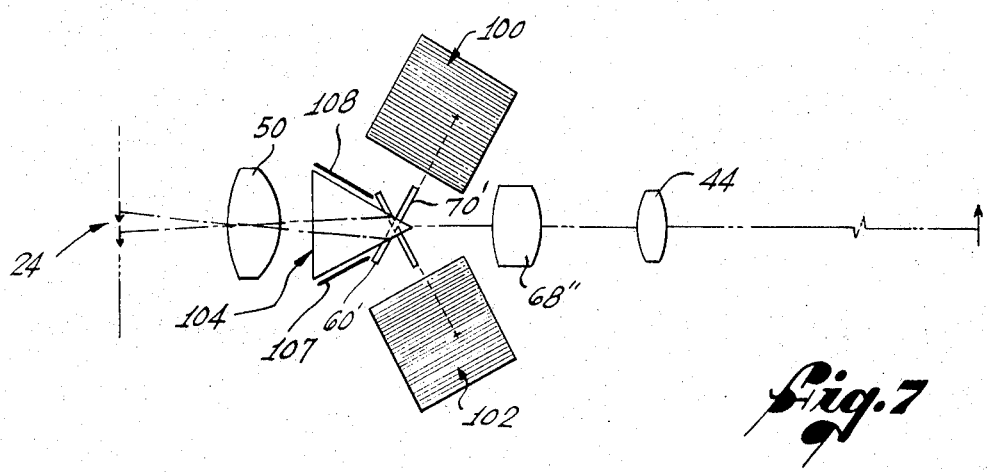
FIG. 7 is a simplified side view of an optical system according to a third embodiment of the invention.
Figure 8:
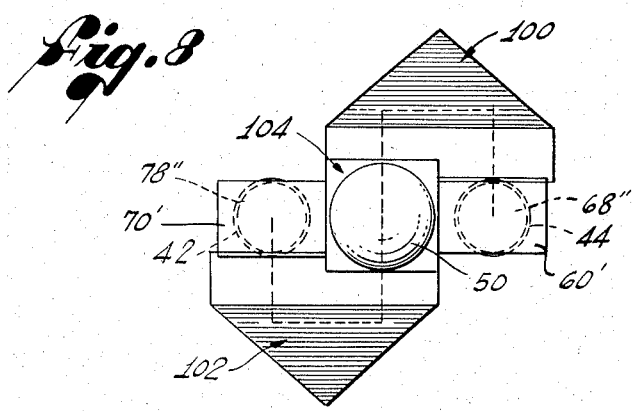
FIG. 8 is a simplified rear, end view of the optical system according to the third embodiment shown in FIG. 7.

A third embodiment of the invention shown in FIGS. 7 and 8 is similar to the second embodiment with the difference that the field lenses are positioned before the first reflection instead of after the third reflection. Thus, the third embodiment includes field lenses 68'' and 78'', associated with the left and right objective lenses, which are spaced in front of the first reflecting surfaces 70' and 60' in close adjacency to the apex of the prism 104. This arrangement may be desirable when utilizing objective lenses of relatively shorter focal length which may be desirable in certain applications.

To maintain matched illumination across the images, vignetting masks 107 and 108 (shown in FIG. 7 only) are provided which function in a similar manner to that described for the second embodiment. However, because the prime image is formed at or closely adjacent the field lens, it is relatively further away from the prism 104 and the vignetting effect is more pronounced. As a result, it is necessary to extend the vignetting masks 107 and 108 relatively further along the sides of the prism 104 toward its apex than in the second embodiment.

In a fourth embodiment of the invention, another different arrangement of lenses and prisms is provided between the objective lenses 42 and 44 and the relay lens 50 (FIGS. 9–11). Considering the path of the light from the right objective lens 44, the light rays are reflected upwardly and rearwardly along a first path by a first reflecting surface 60''' (FIG. 9). A second reflecting surface 62''', positioned to receive the light rays from the first reflecting surface, reflects the light rays horizontally and laterally along a second path. Because of the rearward inclination of the light rays traveling in the first path, there will be a rearward component of travel causing the light rays in the second, horizontal path to be inclined rearwardly as well as laterally.

A third reflecting surface 64''' positioned to receive the light rays from the second reflecting surface 62''' reflects the light rays downwardly at a rearward and downward inclination in a third path in which is positioned a field lens 68'''. The focal length of the objective is such that it forms a prime image at, or very close to, the field lens 68'''. The light rays in the third path are then reflected along a generally horizontal and rearward fourth path by a fourth reflecting surface 66'''.

It will be understood that the composite effect of the four reflections followed by the relay lens is the same as that described for the preceding embodiments.

In more detail, the first reflecting surface 60''' is constituted by an upwardly and rearwardly inclined rear face of a truncated isosceles prism 110 which has a vertically and laterally extending entrance face 112 facing towards the right objective lens 44. The light rays reflected by the reflecting surface 60''' pass through an exit face (FIG. 11) of the truncated isosceles prism 110 which is inclined at right angles to the path of the reflected rays. The second and third reflecting surfaces 62''' and 64''' are constituted by side faces of an upper roof prism 116. The roof prism 116 has a horizontally and longitudinally extending apex from which two side faces, constituting the reflecting surfaces 62''' and 64''' extend downwardly and laterally at an inclination to the vertical of 45'. At its lower forward end, the upper roof prism 116 has an entrance face 118 (FIG. 11) inclined at the same vertical rearward inclination as the exit face 114 of the prism 110, in contact therewith. The upper roof prism also includes at its rear lower end, an exit face 120 inclined perpendicularly to the path of the light rays along the third path between the third and fourth reflecting surfaces 64''' and 66'''.

A corresponding but oppositely positioned set of reflecting surfaces is provided for the left image. Thus, the image formed by the left objective lens 42 is reflected by a downwardly and vertically inclined fifth reflecting surface 70''' (FIG. 9) constituting the rear face of a second truncated isosceles prism 120 spaced laterally from the first prism 110. Successive reflections occur at fifth and sixth reflecting surfaces 72''' and 74''' constituted by the side surfaces of a lower roof prism 122 of similar configuration to the upper roof prism 116 but inverted. The light rays reflected by the seventh reflecting surface 74''' pass through a lower field lens 78''' to an upwardly and rearwardly inclined eighth reflecting surface 76''' and then through the relay lens 50 to form a left image in the lower vertical half area of the film frame. The fourth and eighth reflecting surfaces 66''' and 76''' constitute side faces of an isosceles prism 124 of the same configuration as the previously described isosceles prism 104 used in the second embodiment.

In order to maintain matched illumination across the images, vignetting masks 126 and 128 (shown in FIG. 11 only) are provided extending along a portion of the side faces 66''' and 76''' of the prism 124, spaced from the apex thereof. The vignetting masks function in the same way as already described for the second embodiment.

The fourth embodiment, as compared with the preceding embodiments, has the advantage that a reduced interocular distance can be achieved. In the preceding embodiments, the first and fifth reflecting surfaces aligned with the right and left objective lenses, were spaced apart by the width of the prisms defining the fourth and eighth reflecting surfaces. Hence the minimum interocular distance in the first embodiment could not be less than the width of the truncated prisms plus half the width of the objective lenses or the first and fifth reflectors (whichever is greater). Similarly the minimum interocular distance in the second and third embodiments could not be less than the width of the isosceles prism plus half the width of the objective lenses or the first and fifth reflectors (whichever is the greater). However, in the fourth embodiment, the prism 124 is not positioned laterally between the first and fifth reflecting surfaces 60''' and 70''' but is spaced rearwardly of them. This spacing is enabled becasue of the rearward inclination of the second and fourth light paths through the roof prisms. As a result of positioning the isosceles prism 124 behind the first and fifth reflecting surfaces, the truncated isosceles prisms 110 and 112 can be moved into side-by-side abutting relationship, not separated by the width of the isosceles prism 124. The net effect is that a closer interocular distance, by which is meant the minimum lateral spacing between the objective lenses 42 and 44, is possible.

Figure 13:
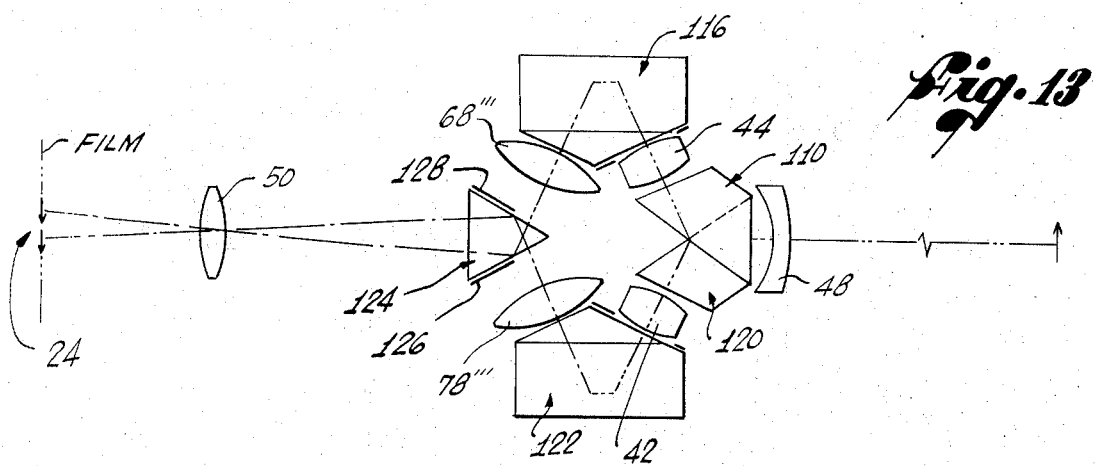
FIG. 13 is a simplified side view of an optical system according to a fifth embodiment of the invention.

For some applications it is important to place the objective lenses after their respective first reflections. One important advantage is that this arrangement allows the use of objective lenses with appreciably shorter back focal distances than is required in embodiment four. For such applications, it is advantageous to utilize a fifth embodiment of the stereo-optical system according to the invention, shown in FIG. 13 The fifth embodiment is generally similar to the fourth embodiment shown in FIG. 11, with the difference that the objective lenses 42 and 44 are positioned after the associated first reflecting surfaces, instead of forwardly of them. To achieve this result, the roof prisms 116 and 112 are spaced relatively further apart thereby providing a gap between each roof prism and the associated one of the truncated prisms 110 and 120 in which the associated one of the objective lenses 42 and 44 is positioned. With this arrangement, each objective lens is closer to the associated one of the field lenses 68''' and 78''' at which the prime image is formed, thereby reducing the back focal distance as compared with the preceding embodiments in which the objective lenses were positioned in advance of the first reflection. The negative lens elements 46 and 48 are positioned forwardly of the first reflecting surfaces, however. Additional masking is provided on the surfaces of the roof prisms facing towards the objective lenses 42 and 44 outside the area occupied by the imaging rays in their path to prevent unwanted stray light from degrading the image quality.

For some applications when the area available for image recording does not have the desired height to width ratio, it is advantageous to incorporate an anamorphic lens or prism system into the stereo optical system of each of the preceding embodiments of the invention, as shown in FIG. 15. These anamorphic optics require that the light rays from each image point in the prime and relayed images be collimated when presented to the anamorphic optics and so, in place of the single relay lens 50 further to described, a relay lens comprising two spaced relay lens components 50a and 50b are provided. The relay lens component 50a collimates the light rays from the prime image points and the relay lens component 50b focuses the collimated rays at the recording plane 24.

The anamorphic lens system, as shown in FIG. 15, is positioned between the relay lens components 50a and 50b and includes a positive cylindrical lens component 150 adjacent the second relay lens component 50b and a negative cylindrical lens element 152 between the positive cylindrical lens element 150 and the relay lens component 50a.

The effect of the anamorphic optical system on the images on the picture aperture 24 is to leave one dimension of the image unaffected while accomplishing an expansion or conversely a compression of the other dimension. By suitable choice of the cylindrical components 150 and 152, it is possible to achieve a compression of the images in one direction which can be of the order of approximately 2:1.

Alternately, the anamorphic lens system can be reversed with the negative cylindrical lens component being positioned adjacent the second relay lens component 50b and the positive cylindrical lens component being position adjacent the first relay lens component 50a. If the anamorphic lens system is placed in this manner it will be understood that an expansion of the recorded image will take place.

In place of the foregoing lens anamorphic system positioned between the divided realy lens components 50a and 50b, it is possible, as an alternative, to utilize a prism anamorphic system such as the prism anamorphiser disclosed in U.S. Pat. No. 1,898,787 to Newcomer.

The anamorphic system cooperates uniquely with the relay lens components of the stereo-optical system of the invention in that only one anamorphic system need be provided to simultaneously squeeze both the left and the right stereo images. The overall combination is therefore more simple and less costly than prior stereo-optical systems in which separate carefully matched anamorphic system were required for each of the left and right objective lenses. In addition, there is no problem of focusing the anmaorphic system with the objective lenses as has proved troublesome in certain prior devices, becasue the present anamorphic optical system functions in association with the relay lenses and field lenses whose focal lengths and relative positions in relation to the picture aperture are fixed and do not change.

Although the invention has been described with reference to certain preferred embodiments, it will be understood by those skilled in the art that many changes may be made, such as, for example, reversing the optical paths from left to right or from bottom to top, or using prisms and mirrors interchangeably which will fall within the invention described herein.

I claim:

1. For attachment to a camera, the camera including a supply a film and a film drive mechanism for advancing successive frames of the film past a picture aperture; an optical system extending in a longitudinally forward direction from the picture aperture for producing a pair of vertically spaced left and right images of a field of view on the film, an optical system comprising:

laterally and horizontally spaced, left and right objective lenses for forming left and right images of the field of view;

an inverting, relay lens positioned between said objective lenses and the picture aperture;

left image erecting means extending in an optical path which includes said left objective lens and said relay lens for providing an incident left image therefor; and right image erecting means extending in another optical path which includes said right objective lens and said relay lens for providing an incident right image therefor vertically aligned with and spaced vertically from said incident left image, said relay lens projecting vertically aligned and separated, left and right images on the film in opposite vertical half areas of the picture aperture, each said image erecting means causing a change of image orientation between the associated one of said objective lenses and said relay lens which is opposite to the inversion of image orientation caused by said inverting relay lens.

2. An optical system as defined in claim 1, wherein each of said left and right image erecting means includes:

at least two reflecting means in the associated one of said optical paths for collectively causing a reversal of image orientation in a first plane; an at least two other reflecting means interposed in the associated said optical path for causing a reversal of image orientation in a second plane perpendicular to the first plane, said relay lens causing a reversal of orientation in both said first and second planes which is opposite to the reversal in both said planes caused by all said reflecting means.

3. For attachment to a camera, the camera including a supply of film and a film drive mechanism for advancing successive frames of the film past a picture aperture; an optical system extending in a longitudinally forward direction from the picture aperture for producing a pair of vertically spaced left and right images of a field of view on the film, the optical system comprising:

laterally and horizontally spaced, left and right objective lenses;

an inverting, relay lens positioned between said objective lenses and the picture aperture;

first, second, third and fourth reflecting surfaces arranged in sequentially reflecting relation to define a first optical path which includes one of said objective lenses and said relay lens, two of said first through fourth reflecting surfaces causing a collective 180° vertical reversal of image orientation and the other two of said first through fourth reflecting surfaces causing a collective 180° lateral reversal of image orientation; a first field lens interposed in said first path; fifth, sixth, seventh and eighth reflecting surfaces arranged in sequentially reflecting relation to define a second optical path which includes the other of said objective lenses and said relay lens, two of said fifth through eighth reflecting surfaces causing a collective 180° vertical reversal of image orientation and the other two of said fifth through eighth reflecting surfaces causing a collective 180° lateral reversal of image orientation; and a second field lens interposed in said second path; said relay lens projecting vertically separated and aligned, left and right images on the film within opposite vertical half ares of the picture aperture.

4. An optical system as defined in claim 3, wherein:

said first and fifth reflecting surfaces receive rearwardly and generally horizontal, incident light rays from said one and said other objective lenses, respectively, and reflect the light rays in generally upward and downward directions, respectively;

said second and sixth reflecting surfaces receive light rays from said first and fifth reflecting surfaces, respectively, and reflect the light rays generally horizontally in opposite lateral directions;

said third and seventh reflecting surfaces receive light rays from said second and sixth reflecting surfaces, respectively, and reflect the light rays in generally downward and upward directions, respectively; and said fourth and eighth reflecting surfaces receive light rays from said third and seventh reflecting surfaces, respectively, and reflect the light rays in generally rearward horizontal directions.

5. An optical system as defined in claim 4, wherein said fourth and eighth reflecting surfaces are vertically aligned and spaced to provide incident images for said relay lens which are in vertically aligned and spaced relation.

6. An optical system as defined in claim 5, wherein the picture aperture is intersected at its vertical midpoint by a horizontal reference plane extending in horizontal and lateral directions and wherein:

said fourth and eighth reflecting surfaces are positioned in vertical alignment on opposite sides of said horizontal reference plane inclined vertically and rearwardly therefrom in symmetrically opposite directions.

7. An optical system as defined in claim 6, wherein each of said reflecting surfaces causes reflection of the light rays reflected thereby through approximately a right angle.

8. An optical system as defined in claim 7, wherein:

said fourth reflecting surface is constituted by the hypotenuse face of a first right angle prism, said hypotenuse face extending at an inclination of about 45° in an upward and rearward direction; and wherein:
said eighth reflecting surface is constituted by the hypotenuse face of a second right angle prism, said second hypotenuse face extending at an inclination of about 45° in a downward and rearward direction, said first and second prisms having their adjacent corners removed to a predetermined extent to adjust the relative vertical positioning between the adjacent said hypotenuse faces, thereby causing a predetermined vertical separation of said incident images.

9. An optical system as defined in claim 7, wherein:

said second and third reflecting surfaces are constituted by the side faces of a porro prism having its hypotenuse face parallel to and spaced above said horizontal reference plane; and wherein:
said sixth and seventh reflecting surfaces are constituted by the side faces of another porro prism having its hypotenuse face parallel to and spaced below said horizontal reference plane.

10. An optical system as defined in claim 7, wherein said first and second field lenses are interposed between said relay lens and said fourth and eighth reflecting surfaces, respectively and wherein said objective lenses each has a focal length such as to form a prime image surface at the associated said field lens.

11. An optical system as defined in claim 7, wherein said first and fifth reflecting surfaces comprise oppositely inclined hypotenuse faces and fifth and sixth right angle prisms, each of said fifth and sixth prisms having a horizontally and laterally extending side face parallel to and spaced from the hypotenuse face of the adjacent one of said porro prisms by an air gap.

12. An optical system as defined in claim 6, wherein:

said first and fifth reflecting surfaces reflect the light rays in forward, vertically opposite inclinations from said horizontal reference plane; and wherein:

said third and seventh reflecting surfaces direct the light rays reflected thereby in parallel relation to the light rays reflected by said first and fifth reflecting surfaces, respectively, but in relatively opposite directions of travel.

13. An optical system as defined in claim 12, wherein said fourth and eighth reflecting surfaces are constituted by equal, upper and lower side faces of an isosceles prism, said isosceles prism having a third face extending vertically and facing towards said relay lens, said side faces extending vertically and rearwardly on opposite sides of said horizontal reference plane at opposite inclinations thereto.

14. An optical system as defined inclaim 13, wherein:

said second and third reflecting surfaces are constituted by the side faces of a porro prism having its hypotenuse face parallel to and spaced above said upper side face of said isosceles prism; and wherein:
said sixth and seventh reflecting surfaces are constituted by the side faces of another porro prism having its hypotenuse face parallel to and spaced below said lower side face of said isosceles prism.

15. An optical system as defined in claim 6, wherein said first and second field lenses are interposed between said third and fourth reflecting surfaces and between said seventh and eighth reflecting surfaces, respectively, and wherein each of said objective lens has a focal length such as to form a prime image substantially at the associated one of said field lenses.

16. An optical system as defined in claim 6, wherein said first and fifth reflecting surfaces direct the light rays reflected thereby rearwardly in opposite upward and downward vertical directions, respectively, and wherein said third and seventh reflecting surfaces direct the light rays reflected thereby at rearward, vertical inclinations towards said horizontal reference plane.

17. An optical system as defined in claim 16, wherein:
said second and sixth reflecting surfaces direct the light rays reflected thereby generally horizontally at rearward and lateral inclinations.

18. An optical system as defined in claim 16, wherein:
said fourth and eighth reflecting surfaces are constituted by upper and lower side faces of an isosceles prism, said isosceles prism having a third face extending vertically and facing towards said relay lens, said side faces extending vertically and rearwardly on opposite sides of said horizontal reference plane at opposite inclinations thereto.

19. An optical system as defined in claim 18, wherein:
said second and third reflecting surfaces are constituted by opposite, side faces of a roof prism, said side surfaces of said roof prism extending downwardly from a horizontally and longitudinally extending apex at opposite outward lateral inclinations, said roof prism further including,
an exit face of said roof prism parallel to and spaced above said upper side face of said isosceles first prism; and wherein:
said sixth and seventh reflecting surfaces are constituted by opposite side faces of another roof prism, said side surfaces of said other roof prism extending upwardly from a horizontally and longitudinally extending apex at opposite outward lateral inclinations, said other roof prism further including,
an exit face of said other roof prism parallel to and spaced below said lower side face of said isosceles first prism.

20. An optical system as defined in claim 19, further including:
a first prism having,
an entrance face perpendicular to the optical axis of said one of said objective lenses,
an upwardly and rearwardly inclined rear face constituting said first reflecting surface, an exit face perpendicular to the path of light rays reflected from said first reflecting surface;

a second prism having, an exit face perpendicular to the optical axis of said other of said objective lenses, a downwardly and rearwardly inclined rear face constituting said fifth reflecting surface, an exit face perpendicular to the path of light rays reflected from said second reflecting surface;

said one roof prism having, an entrance face parallel to said exit face of said first prism; and said other roof prism having, an entrance face parallel to said exit face said second prism.

21. An optical system as defined in claim 3, further including:

vignetting means associated with each of said fourth and eighth reflecting surfaces for insuring a matched distribution of light intensity over the extent of each of said left and right images formed by said relay lens on the film.

22. An optical system as defined in claim 6, wherein said first and second field lenses are interposed between each of said objective lenses and the associated said first and fifth reflecting surfaces, respectively, and wherein each said objective lens has a focal length such as form a prime image substantially at the associated one of said field lenses.

23. An optical system as defined in claim 22, further including:

vignetting means associated with said fourth and eighth reflecting surfaces for causing a matched distribution of light intensity over the extent of the left and right images formed by said relay lens on the film.

24. An optical system as defined in claim 23, wherein said vignetting means includes:

opaque first and second masks partially overlying the side faces of said isosceles prism spaced from the apex thereof, said masks being positioned symmetrically on an opposite side of the centerline of the image from said apex whereby the imaging rays are cut off equally at opposite extremities of the image by said apex and the associated one of said masks, respectively.

25. An optical system as defined in claim 15, further including:

vignetting means associated with said fourth and eighth reflecting surfaces for causing a matched distribution of light intensity over the extent of the left and right images formed by said relay lens on the film.

26. An optical system as defined in claim 25, wherein said vignetting means includes:

opaque first and second masks partially overlying the side faces of said isosceles prism spaced from the apex thereof, each said mask being positioned symmetrically on an opposite side of the centerline of the associated one of said light paths from said apex whereby the imaging rays are cut off symmetrically at opposite extremities of the image by said apex and the associated one of said masks, respectively.

27. An optical system as defined in claim 18 further including:

vignetting means associated with said fourth and eighth reflecting surfaces for causing a matched distribution of light intensity over the extent of the left and right images formed by said relay lens on the film.

28. An optical system as defined in claim 27, wherein said vignetting means includes:

opaque first and second masks partially overlying the side faces of said isosceles prism spaced from the apex thereof, each said mask being positioned symmetrically on an opposite side of the centerline of associated one of said light paths from said apex whereby the imaging rays are cut off symmetrically at opposite extremities of the image by said apex and the associated one of said masks, respectively.

29. An optical system as defined in claim 1, further including:

an anamorphic optical system positioned in optical communication with said relay lens, said anamorphic optical system compressing the left and right images on the film in one dimension, extending across the images while leaving the images unchanged in another dimension perpendicular to said one dimension.

30. An optical system as defined in claim 3, further including:

an anamorphic optical system positioned in optical communication with said relay lens, said anamorphic optical system compressing the left and right images on the film in one dimension, extending across the images while leaving the images unchanged in another dimension perpendicular to said one dimension.

31. An optical system as defined in claim 3, wherein:

said first and fifth reflecting surfaces are laterally spaced and face toward the field of view to receive rearwardly and generally horizontal incident light rays therefrom and reflect the light rays in generally upward and downward directions, respectively; said one and said other objective lenses being positioned on the reflected side of said first and fifth reflecting surfaces, respectively, to be intersected by the light rays reflected by said reflecting surfaces;

said second and sixth reflecting surfaces receive light rays from said one and said other objective lenses, respectively, and reflect the light rays generally horizontally in opposite lateral directions;

said third and seventh reflecting surfaces receive light rays from said second and sixth reflecting surfaces, respectively, and reflect the light rays in generally downward and upward directions, respectively; and said fourth and eighth reflecting surfaces receive light rays from said third and seventh reflecting surfaces, respectively, and reflect the light rays in generally rearward horizontal directions.

32. An optical system as defined in claim 31, wherein said first and fifth reflecting surfaces direct the light rays reflected thereby rearwardly in opposite upward and downward vertical directions, respectively, and wherein said third and seventh reflecting surfaces direct the light rays reflected thereby at convergent, rearward, vertical inclinations.

* * * * *